(12) United States Patent
Liu et al.

(10) Patent No.: US 10,147,240 B2
(45) Date of Patent: Dec. 4, 2018

(54) PRODUCT IMAGE PROCESSING METHOD, AND APPARATUS AND SYSTEM THEREOF

(71) Applicant: TENCENT TECHNOLOGY (SHENZHEN) COMPANY LIMITED, Shenzhen (CN)

(72) Inventors: Weiguo Liu, Shenzhen (CN); Haopeng Liu, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 15/668,905

(22) Filed: Aug. 4, 2017

(65) Prior Publication Data

US 2017/0330384 A1 Nov. 16, 2017

Related U.S. Application Data

(63) Continuation of application No. PCT/CN2016/079707, filed on Apr. 20, 2016.

(30) Foreign Application Priority Data

May 15, 2015 (CN) .......................... 2015 1 0248899

(51) Int. Cl.
*G06T 19/00* (2011.01)
*G06T 19/20* (2011.01)
(Continued)

(52) U.S. Cl.
CPC ............ *G06T 19/006* (2013.01); *G06T 19/20* (2013.01); *H04N 21/25866* (2013.01);
(Continued)

(58) Field of Classification Search
CPC .............. G06T 19/006; H04N 21/4223; H04N 21/8146
See application file for complete search history.

(56) References Cited

U.S. PATENT DOCUMENTS

2010/0111370 A1 5/2010 Black et al.

FOREIGN PATENT DOCUMENTS

| CN | 101937546 A | 1/2011 |
| CN | 203444524 U | 2/2014 |

(Continued)

OTHER PUBLICATIONS

Machine Translation to English for CN 203444524.*
(Continued)

*Primary Examiner* — Barry Drennan
*Assistant Examiner* — Terrell Robinson
(74) *Attorney, Agent, or Firm* — Marshall, Gerstein & Borun LLP

(57) ABSTRACT

Examples of the present disclosure provide a product image processing method, including: a smart TV box prompting a user via a displaying device, to provide a plurality of 2-dimensional (2D) images used for generating a user body 3D model; receiving by the smart TV box the plurality of 2D images; transmitting by the smart TV box the obtained plurality of 2D images to a server, wherein the server generates the user body 3D model according to the plurality of 2D images, and generates a 3D composed image according to a 3D model of a product selected by the user and the user body 3D model, the 3D composed image reflects a collocation effect of the user body and the product selected by the user; receiving by the smart TV box the 3D composed image from the server, and displaying the 3D composed image via the displaying device.

17 Claims, 9 Drawing Sheets

(51) Int. Cl.
*H04N 21/258* (2011.01)
*H04N 21/4223* (2011.01)
*H04N 21/478* (2011.01)
*H04N 21/81* (2011.01)

(52) U.S. Cl.
CPC ... *H04N 21/4223* (2013.01); *H04N 21/47815* (2013.01); *H04N 21/8146* (2013.01); *G06T 2219/2021* (2013.01)

(56) References Cited

FOREIGN PATENT DOCUMENTS

| CN | 103871099 A | 6/2014 |
|---|---|---|
| CN | 104837066 A | 8/2015 |

OTHER PUBLICATIONS

Machine Translation to English for CN 103871099 A.*
International Search Report, corresponding International Application No. PCT/CN2016/079707 dated Jul. 13, 2016.
Office Action, Chinese Patent Application No. 201510248899.3, dated Jul. 3, 2017.

* cited by examiner

PRODUCT IMAGE PROCESSING METHOD, AND APPARATUS AND SYSTEM THEREOF

CROSS-REFERENCE TO RELATED APPLICATIONS

This application is a continuation of International Application No. PCT/CN2016/079707, filed on Apr. 20, 2016. This application claims the benefit and priority of Chinese Patent Application No. 201510248899.3, filed May 15, 2015. The entire disclosures of each of the above applications are incorporated herein by reference.

FIELD OF THE DISCLOSURE

The present disclosure relates to computer techniques, and more particularly, to a product image processing method, and an apparatus and a system thereof.

BACKGROUND OF THE DISCLOSURE

With the development of techniques, e-commerce has entered thousands of households and integrated with daily life of people. Among which, the e-shopping develops most rapidly. Under the impact of the Internet, conventional household electronic appliances have shown a new product form in front of the world.

E-shopping of products such as clothing has been well known by users long before the Internet booms. However, since the users cannot see the product and cannot even try like in stores, most venders exhibit images of products via television, e.g., static images or videos of a model wearing effect or a testing effect. It is hard for the users to determine whether the product is suitable based on such images.

SUMMARY OF THE DISCLOSURE

Examples of the present disclosure provide a method, an apparatus and a system for processing a product image, so as to exhibit a 3-dimensional (3D) composed image expressing a 3D effect of a user's body and the product selected by the user, such that the user is able to determine more accurately whether the selected product is suitable.

The technical solution of the present disclosure is as follows.

A product image processing method includes:

prompting a user, by a smart TV box via a displaying device, to provide a plurality of 2-dimensional (2D) images used for generating a user body 3D model;

receiving by the smart TV box the plurality of 2D images;

transmitting by the smart TV box the obtained plurality of 2D images to a server, wherein the server generates the user body 3D model according to the plurality of 2D images, and generates a 3D composed image according to a 3D model of a product selected by the user and the user body 3D model, the 3D composed image reflects a collocation effect of the user body and the product selected by the user;

receiving by the smart TV box the 3D composed image from the server, and displaying the 3D composed image via the displaying device.

A smart TV box includes: a processor and a non-transitory computer readable memory; wherein the non-transitory computer-readable memory stores instruction modules, the instruction modules comprise: a first transmitting module, an obtaining module, a second transmitting module, and a receiving module; wherein the first transmitting module is to prompt a user via a displaying device to provide a plurality of 2D images used for generating a user body 3D model;

the obtaining module is to obtain the plurality of 2D images;

the second transmitting module is to transmit the plurality of 2D images obtained by the obtaining module to a server, wherein the server generates a user body 3D model according to the plurality of 2D images and generates a 3D composed image according to the user body 3D model and a 3D model of a product selected by the user, the 3D composed image reflects a collocation effect of the user body and the product selected by the user;

the receiving module is to receive the 3D composed image from the server; and the first transmitting module is further to transmit the 3D composed image received by the receiving module to the displaying device, wherein the displaying device displays the 3D composed image.

A smart TV includes: a processor and a non-transitory computer-readable memory, the non-transitory computer-readable memory stores instruction modules, the instructions modules comprise: a first transmitting module, a displaying module, an obtaining module, a second transmitting module, and a receiving module;

the first transmitting module is to prompt a user via the displaying module to provide a plurality of 2D images used for generating a user body 3D model;

the obtaining module is to obtain the plurality of 2D images;

the second transmitting module is to transmit the plurality of 2D images obtained by the obtaining module to a server, wherein the server generates the user body 3D model according to the plurality of 2D images and generates a 3D composed image according to a 3D model of a product selected by the user and the user body 3D model, the 3D composed image reflects a collocation effect of the user body and the product selected by the user;

the receiving module is to receive the 3D composed image from the server; and the first transmitting module is further to transmit the 3D composed image received by the receiving module to the displaying module, and the displaying module displays the 3D composed image.

A product image processing system includes: a smart TV box, a displaying device and a server;

the smart TV box is to prompt a user via the displaying device to provide a plurality of 2D images used for generating a user body 3D model, obtain the plurality of 2D images, transmit the obtained plurality of 2D images to the server, receive a 3D composed image from the server, and transmit the 3D composed image to the displaying device;

the server is to generate the user body 3D model according to the plurality of 2D images received from the smart TV box and generate the 3D composed image according to a 3D model of a product selected by the user and the user body 3D model, wherein the 3D composed image reflects a collocation effect of the user body and the product selected by the user; and transmit the 3D composed image to the smart TV box; and the displaying device is to receive the 3D composed image from the smart TV box, and display the 3D composed image.

A product image processing system includes: a smart TV and a server;

the smart TV is to prompt a user to provide a plurality of 2D images used for generating a user body 3D model, obtain the plurality of 2D images, transmit the 2D images to the server, receive a 3D composed image from the server and display the 3D composed image; and the server is to generate the user body 3D model according to the plurality of 2D images received from the smart TV and generate the 3D composed image according to a 3D model of a product selected by the user and the user body 3D model, and transmit the 3D composed image to the smart TV, wherein the 3D composed image reflects a collocation effect of the user body and the product selected by the user.

According to the product image processing method, apparatus and system provided by the examples of the present disclosure, multiple 2D images of the user may be obtained via the smart TV box. The server may generate a user body 3D model according to the multiple 2D images and may generate a 3D composed image according to the user body 3D model and a 3D model of the product selected by the user. The 3D composed image is able to reflect a collocation effect of a combination of the user body and the product selected by the user. The smart TV box displays the 3D composed image to the user via the displaying device. The solution provided by the examples of the present disclosure improves the functions of the smart TV box. Thus, the user is able to accurately estimate whether the selected product is suitable according to the 3D composed image, so as to determine whether to buy the product.

BRIEF DESCRIPTION OF THE DRAWINGS

Hereinafter, drawings used in the description of the examples or the related art are briefly described to make the technical solution of the present disclosure or the related art clearer. It is apparent that the following drawings are merely some examples. Those with ordinary skill in the art would obtain other drawings based on the following without inventive work.

DETAILED DESCRIPTION OF THE DISCLOSURE

Hereinafter, the technical solution provided by examples of the present disclosure is described with reference to accompanying drawings to make the technical solution clear. It is apparent that the following are merely some examples and do not form all examples of the present disclosure. Those with ordinary skill in the art would obtain other examples based on the following without inventive work. These are also within the protection scope of the present disclosure.

In TV shopping programs, most venders exhibit images of products via television, e.g., static pictures of products or videos of a model wearing effect or testing effect. Users can hardly accurately determine whether the product is suitable for them based on such images.

In view of this, examples of the present disclosure provide a product image processing method. In the method provided by the examples of the present disclosure, a plurality of 2D images used for generating a user body 3D model is obtained via a smart TV box. A server generates a user body 3D model according to the plurality of 2D images, and generates a 3D composed image according to the user body 3D model and a 3D model of the product selected by the user, wherein the 3D composed image reflects a 3D collocation effect of the user body and the selected product. The smart TV box receives the 3D composed image from the server, and displays the 3D composed image to the user via a displaying device. Thus, the user is able to accurately estimate whether the selected product is suitable for him according to the displayed 3D composed image, so as to determine whether to buy the product.

Figure 1:
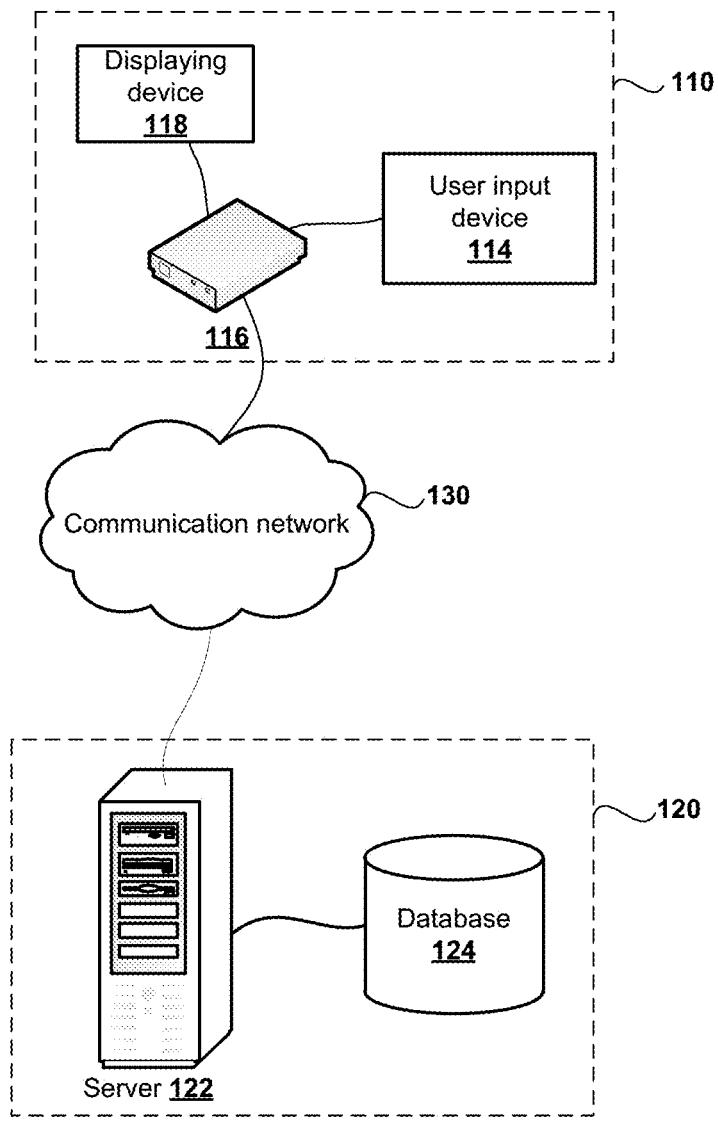
FIG. 1 is a schematic diagram illustrating a product image processing system according to various examples of the present disclosure.

FIG. 1 is a schematic diagram illustrating a product image processing system according to some examples of the present disclosure. As shown in FIG. 1, the product image processing system 10 includes: a user end 110, a server end 120 and a communication network 130. The user end 110 may include: a user input device 114, a smart TV box 116 and a displaying device 118. The server end 120 may include: a server 122 and a database 124.

In some examples of the present disclosure, the smart TV box 116 prompts the user to provide a plurality of 2D images for generating the user body 3D model, obtains the plurality of 2D images provided by the user, transmits the plurality of 2D images to the server 122 via the communication network 130, receives the 3D composed image returned by the server 122 and displays the 3D composed image to the user via the displaying device 118, the 3D composed image is generated by the server 122 according to the user body 3D model and the 3D model of the product selected by the user, thus is able to reflect a 3D collocation effect of the user body and the selected product. Therefore, the user is able to accurately estimate according to the 3D composed image whether the selected product is suitable.

In some examples, the displaying device 118 may be a conventional TV, or a displaying component of a smart TV, or other device which is able to receive data transmitted by the smart TV box 116 and displays it to the user. In some examples, the smart TV refers to a television which has an operating system, allows software installation or uninstallation by the user, and has internet accessing capability.

If the displaying device 118 is a conventional TV, the smart TV box 116 and the displaying device 118 are two separate physical entities. The smart TV box 116 and the displaying device 118 may be communicatively connected with each other via a high definition multimedia interface (HDMI). The smart TV box 116 may transmit data received from the communication network 130 or user input device 114 to the displaying device 118 for display.

If the displaying device 118 is a displaying component of a smart TV, the smart TV box 116 is a component integrated in the smart TV, and may communicate with the displaying component via an internal bus or other manners.

In some examples, the user may control operations of the smart TV box 116 via the user input device 114, e.g., select a particular product, or trigger the TV box 116 to transmit 2D images to the server 122, etc. The user input device 114 and the smart TV box 116 may be communicatively connected via a wired or wireless manner. For example, the user input device 114 may be a remote control. The remote control 114 communicates with smart TV box 116 via infrared. Or, the user input device 114 may be a terminal device having a data computing processing function, including but is not limited to computer (with communication module), smart phone, palm computer, tablet computer, etc. These terminal devices are installed with operating systems, including but is not limited to Windows operating system, Android operating system, Symbian operating system, Windows mobile operating system, and iPhone OS operating system, etc. At this time, the smart TV box 116 may communicate with the terminal device having the data computing processing ability via various manners, e.g., wired manner, Bluetooth, wireless local area network, etc.

In some examples, the user end 110 may further include one or more cameras (not shown in FIG. 1). The smart TV box 116 may capture images of the user using the one or more cameras, so as to obtain the 2D images required for generating the user body 3D model. The one or more cameras may be independent cameras, or may be integrated with the smart TV box 116 or the displaying device 118 or the user input device 114. For example, if the user input device 114 is a smart phone, the camera may be an internal camera of the smart phone.

In some examples, the user end 110 may further include a storage device (not shown in FIG. 1). The storage device may store the 2D images used for generating the user body 3D model. At this time, the smart TV box 116 may obtain the 2D images required for generating the user body 3D model through reading the 2D images stored from the storage device. The storage device may be an independent storage, e.g., U disk or other portable storage devices. Or, the storage device may also be a storage module in the terminal device having data computing and processing ability. The terminal device may be but is not limited to computer (with communication module), smart phone, palm computer, tablet computer, etc. In some examples, the storage device may be a storage module in the user input device 114, i.e., the smart TV box 116 obtains the 2D images required for generating the user body 3D model through reading the storage module of the user input device 114.

In some examples, the server end 120 may be a computer system, including one or more computers. For example, the server end 120 may include a server 122 for data processing, and a database 124 for saving the processed data. For example, the server 122 may generate the user body 3D model according to the plurality of 2D images provided by the user, and generate the 3D composed image according to the user body 3D model and the 3D model of the product selected by the user. The database 124 stores the user body 3D model and the 3D composed image generated by the server 122. In addition, the server end 120 may further include several hardware components (not shown in FIG. 1), such as display, keyboard, mouse, hard disk, etc.

The communication network 130 may be a wireless or wired communication network, e.g., IP network, cellular mobile communication network, etc.

Figure 2:
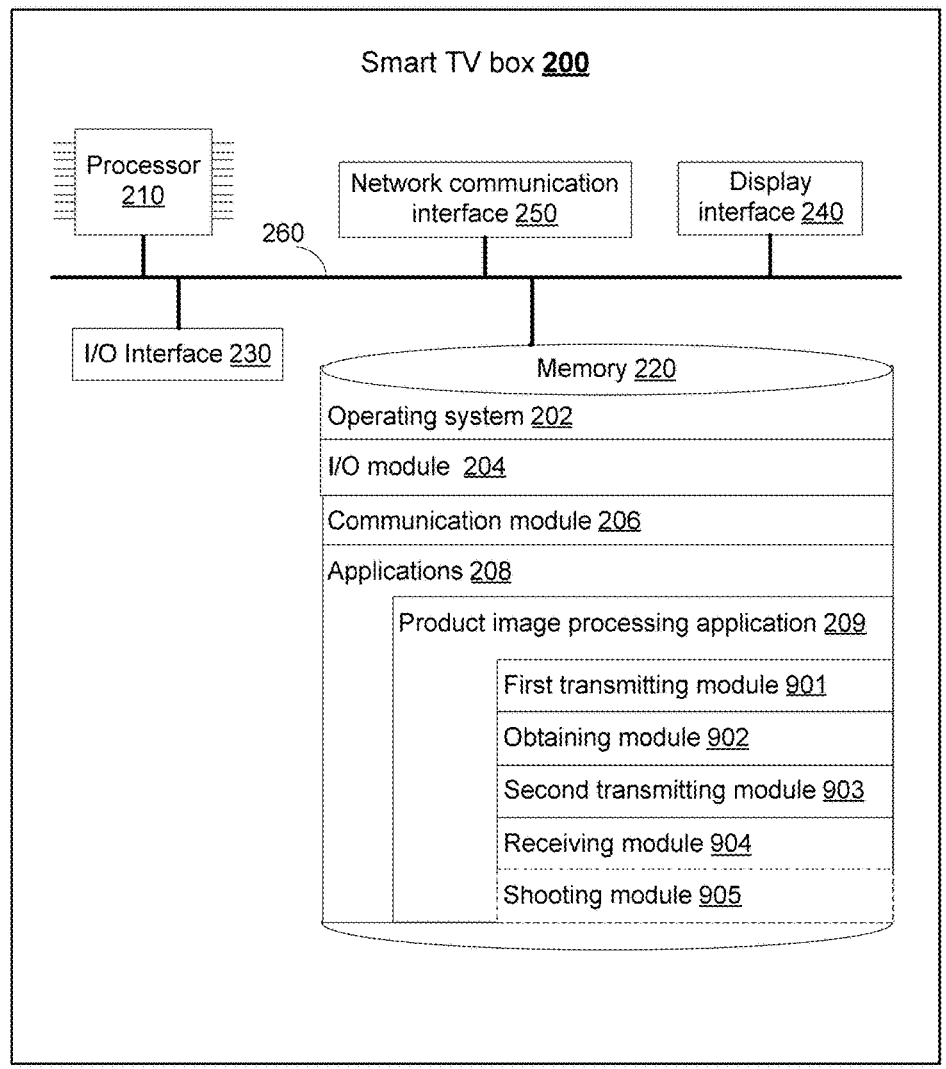
FIG. 2 is a schematic diagram illustrating a structure of a smart TV box according to various examples of the present disclosure.

FIG. 2 is a schematic diagram illustrating a structure of a smart TV box according to some examples of the present disclosure. As shown in FIG. 2, the smart TV box 200 includes a processor 210, a non-transitory computer-readable memory 220, an I/O interface 230, a display interface 240 and a network communication interface 250. These components communicate with each other via a bus 260. In some examples, the memory 220 stores multiple program modules: an operating system 202, an I/O module 204, a communication module 206 and an application 208. The processor 210 may read the program modules in the storage medium 220 to implement the solution provided by examples of the present disclosure.

In some examples, the I/O interface 230 may be connected with an input/output device, e.g., the user input device 114 as shown in FIG. 1. The I/O interface 230 transmits input data received from the input device to the I/O module 204 for processing, and transmits data output from the I/O module 204 to an output device.

The network communication interface 250 may transmit data received from the communication network 130 to the communication module 206, and transmit data received from the communication module 206 to the communication network 130.

The application program 208 stored in the memory 220 may include a product image processing application 209. As shown in FIG. 2, the product image processing application 209 may include: a first transmitting module 901, an obtaining module 902, a second transmitting module 903, a receiving module 904, and a camera module 905. The functions and operations of the modules 901~905 are described in the following of the present disclosure. The processor 210 may execute the product image processing application 209, so as to prompt the user to provide 2D images required for generating the user body 3D model, transmit the 2D images to the server 122 via the communication network 130, receive the 3D composed image returned by the server 122, and display the 3D composed image via the displaying device 118. The 3D composed image is generated by the server according to the user body 3D model and the 3D model of the product selected by the user, thus is able to reflect the 3D collocation effect of the user body and the selected product.

Figure 3:
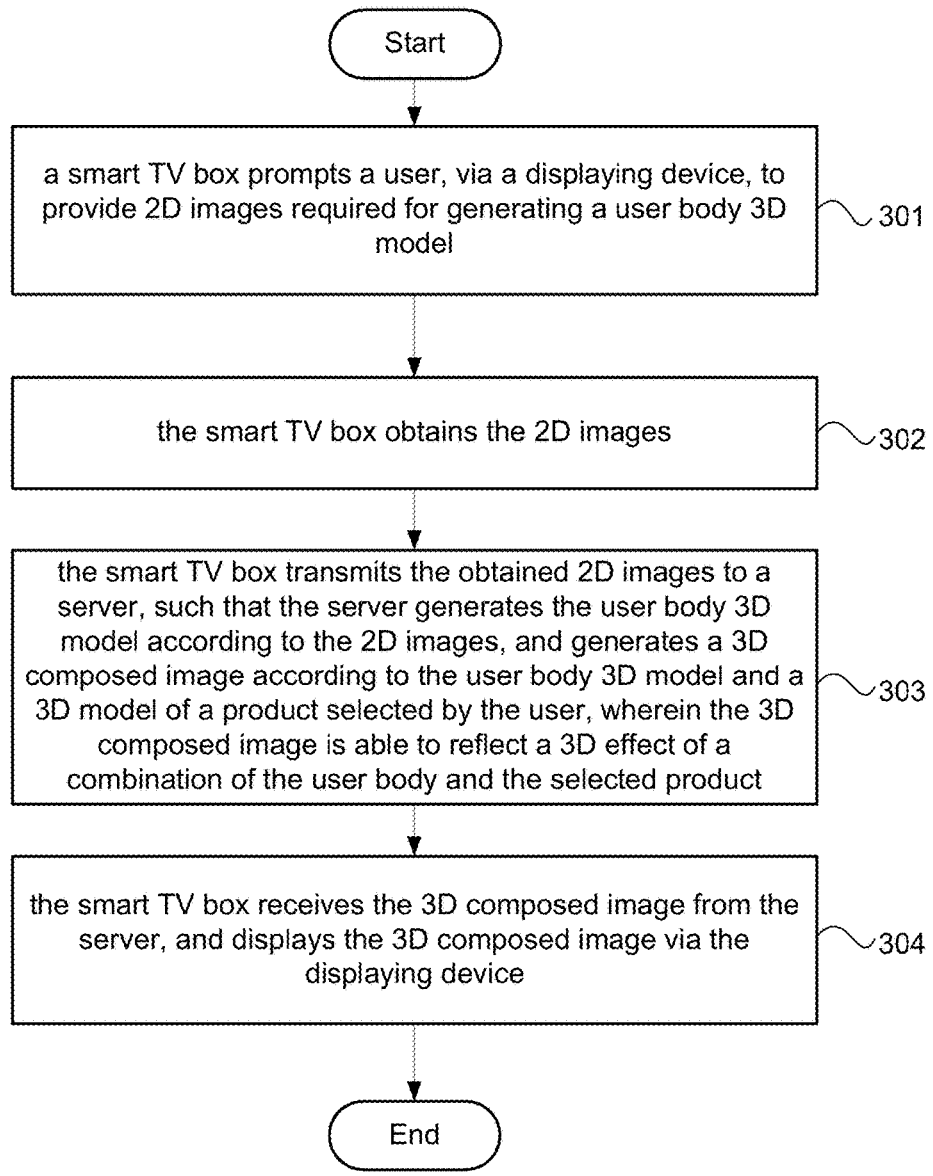
FIG. 3 is a flowchart illustrating a product image processing method according to some examples of the present disclosure.

FIG. 3 is a flowchart illustrating a product image processing method according to some examples of the present disclosure. As shown in FIG. 3, the method includes the following.

In block 301, a smart TV box prompts a user, via a displaying device, to provide a plurality of 2D images required for generating a user body 3D model.

In block 302, the smart TV box obtains the plurality of 2D images.

In block 303, the smart TV box transmits the obtained plurality of 2D images to a server, such that the server generates the user body 3D model according to the 2D images, and generates a 3D composed image according to the user body 3D model and a 3D model of a product selected by the user, wherein the 3D composed image is able to reflect a 3D collocation effect of the user body and the selected product.

In block 304, the smart TV box receives the 3D composed image from the server, and displays the 3D composed image via the displaying device.

Through the above blocks 301 to 304, the smart TV box is able to display the 3D composed image which reflects the 3D effect of the combination of the user body and the selected product to the user via the displaying device. Thus, the user is able to see the collocation effect of the user body and the selected product, and thereby can accurately determine whether the selected product is suitable.

In some examples of the present disclosure, the product may be clothing, shoes, hat, watch, accessory, etc. In the following, description is provided taking clothing as an example. It should be noted that, the solution of the present disclosure is not restricted to clothing.

In some examples, the smart TV box and the displaying device may be two separate physical entities, or may be two components in the same physical entity (such as smart TV).

In some examples, after the user selects a product, in response to a 3D composed image obtaining request of the user, the smart TV box transmits a composing request carrying an identifier of the user to the server, requesting the server to generate the 3D composed image. After receiving the composing request, the server determines according to the user identifier carried in the request whether it has a user body 3D model corresponding to the user. If not, the server returns a 2D image obtaining request to the smart TV box, requesting for the 2D images used for generating the user body 3D model. After generating the user body 3D model according to the 2D images received from the smart TV box, the server may save the user body 3D model. Thus, the server does not need to generate the user body 3D model each time the user selects a product. If the server determines that it has the corresponding user body 3D model, the server generates the 3D composed image according to the stored user body 3D model and the 3D model of the selected product.

Figure 4:
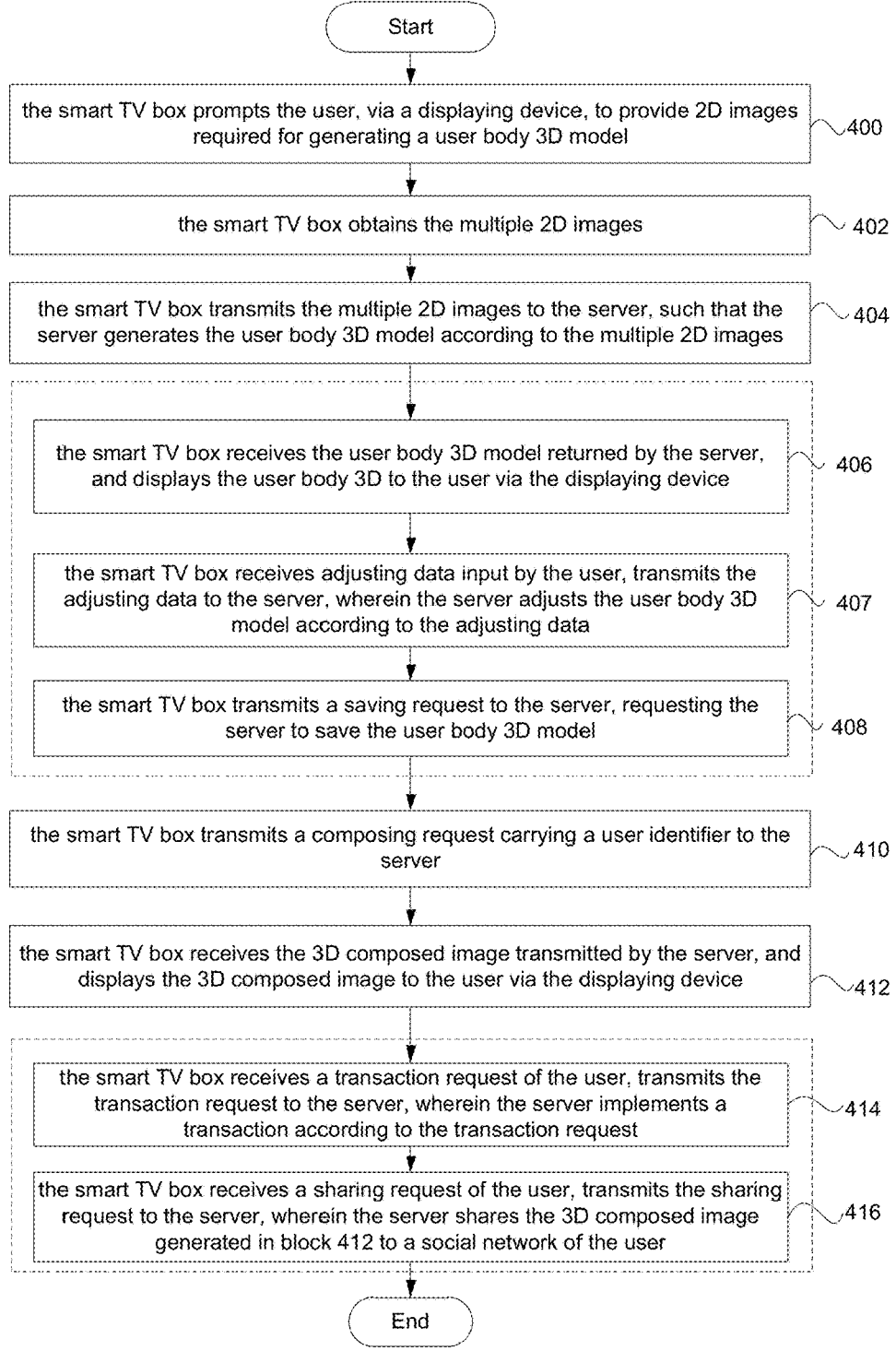
FIG. 4 is a flowchart illustrating another product image processing method according to some examples of the present disclosure.

FIG. 4 is a flowchart illustrating a product image processing method according to some examples of the present disclosure. In some examples, before the user selects a product, the smart TV box prompts the user to provide the 2D images required for generating the user body 3D model. The smart TV box obtains the 2D images of the user and transmits the 2D images to the server which generates the user body 3D model. After the user selects a product, the server generates the 3D composed image reflecting the collocation effect of the combination of the user body and the selected product according to the previously generated user body 3D model and the 3D model of the product selected by the user. In some examples, clothing is taken as an example. As shown in FIG. 4, the method includes the following.

In block 400, the smart TV box prompts the user, via a displaying device, to provide 2D images required for generating a user body 3D model.

In this block, the smart TV box may display a webpage or a virtual TV channel on the displaying device, so as to prompt the user to provide the 2D images required for generating the user body 3D model.

In some examples, the 2D images may be images of the user from different angles, e.g., front, side, back. Based on the 2D images, the server may perform geometry measurement to different parts of the user body, so as to obtain geometry characteristics of different parts of the user body and generate the 3D model of the user.

In some examples, the generation of the 3D model (or referred to as 3D reconstruction) is a process of reconstructing 3D information based on a single view or images of multiple views. Since the information of a single view is incomplete, the 3D reconstruction requires experience knowledge. The 3D reconstruction based on multiple views is relatively less complicated. Therefore, in some examples of the present disclosure, it is possible to prompt the user to provide multiple 2D images (i.e., images of multiple views), so as to facilitate the generation of the 3D model, i.e., the 3D reconstruction.

Figure 5:
FIG. 5 shows a page displayed on a displaying device by the smart TV box according to some examples of the present disclosure.

FIG. 5 is a schematic diagram illustrating a page displayed on the displaying device by the smart TV box according to various examples of the present disclosure. As shown in FIG. 5, the page is used for prompting the user to provide the multiple 2D images required for generating the user body 3D model. On the page as shown in FIG. 5, the smart TV box prompts the user to provide three 2D images, respectively is front 2D image, side 2D image and back 2D image (see 501, 502, 503 in FIG. 5). Thus, it is possible to avoid the user provide inappropriate images which may lead to large error of the 3D composed image.

In this block, if the smart TV box displays a virtual TV channel on the displaying device, when the user selects the virtual TV channel, the smart TV box obtains contents corresponding to the virtual TV channel from a network server, and displays the obtained contents on the screen of the TV. Similarly, the virtual TV channel may also prompt the user to provide front, side and back 2D images.

In block 402, the smart TV box obtains the multiple 2D images.

In this block, the smart TV box may obtain the multiple 2D images of the user via various manners, including but not limited to the following:

Manner 1: shoot for the user using one or more cameras, and take the 2D images obtained by shooting as the 2D images used for generating the user body 3D model. For example, the user may click a shooting button 504 as shown in FIG. 5 to shoot.

Manner 2: read a storage device connected with the smart TV box, and take the read 2D images as the 2D images used for generating the user body 3D model. For example, the user may click the upload button 505 as shown in FIG. 5 to upload the 2D images in the storage device to the smart TV box.

Figure 6:
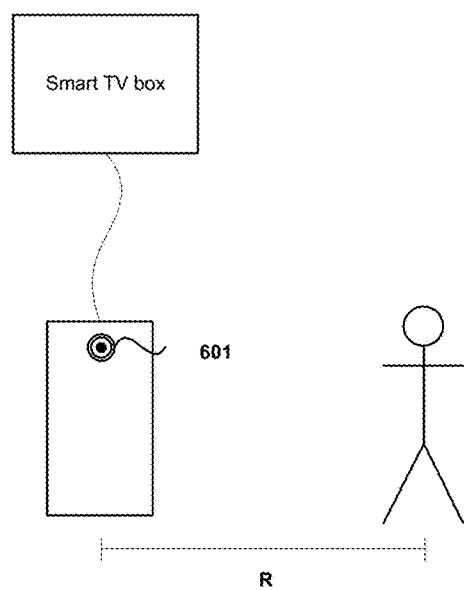
FIG. 6 is a schematic diagram illustrating a process of obtaining 2D images by the smart TV box according to some examples of the present disclosure.

As to the manner 1, referring to FIG. 6, the user may be shot using the camera 601. In some examples of the present disclosure, if there are multiple cameras, the multiple cameras may shoot for the user at the same time from different angles. Geometry characteristics (i.e. body shape) of the user body may be obtained through the shot 2D images, so as to generate the 3D model of the user body. It should be noted that, during a dress-fitting procedure, besides body shape, real height of the user should be considered. Therefore, besides obtaining the body shape according to the shot 2D images, it is also required to obtain the user's real height. The real height of the user may be calculated according to a distance R between a plane of the user and the camera 601. In addition, the user may input his real height manually. Thus, calculation may be reduced and the 3D model generation speed may be increased.

Figure 7:
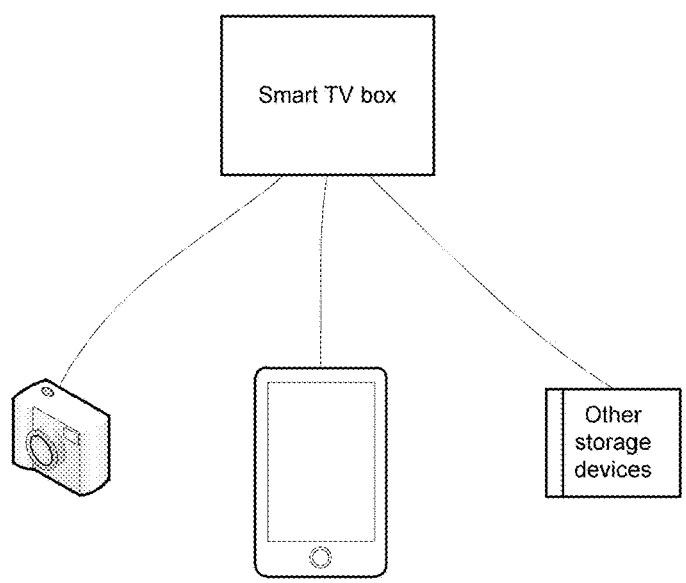
FIG. 7 is a schematic diagram illustrating another process of obtaining 2D images by the smart TV box according to some examples of the present disclosure.

For the manner 2, referring to FIG. 7, the smart TV box may read the connected storage device (such as digital camera, portable storage medium, smart phone, computer, etc.) to obtain the 2D images.

Similar as manner 1, the user may also input his real height manually.

It should be noted that, the smart TV box may obtain the multiple 2D images required for generating the user body 3D model via any one or a combination of the above two manners.

In block 404, the smart TV box transmits the multiple 2D images to the server, such that the server generates the user body 3D model according to the multiple 2D images.

In this block, after obtaining the multiple 2D images required for generating the user body 3D model, the smart TV box may transmit a composing request carrying the multiple 2D models to the server, requesting the server to generate the user body 3D model according to the multiple 2D images carried in the request.

After receiving the composing request, the server may generate the user body 3D model according to a predefined algorithm. For example, it is possible to retrieve geometry characteristics of different body parts from the 2D images to generate the user body 3D model.

In some examples, the user body 3D model may be generated via two manners. In one manner, a geometry modeling software may be utilized to generate a manually-controlled 3D geometry model via man-machine interaction, e.g., using 3DMAX, Maya, AutoCAD, UG geometry modeling software. These geometry modeling software generally use curves or curved surface with mathematical expressions to denote a geometric shape. Another method for generating the user body 3D model is to obtain a real geometric shape of the user body via some manners, also referred to as 3D reconstruction. The 3D reconstruction refers to a mathematical procedure and computer techniques which construct object 3D information (shape, etc.) utilizing 2D projection. In examples of the present disclosure, the second method is adopted to generate the user body 3D model.

Hereinafter, the method for generating the user body 3D model is described.

In principle, the 3D model is obtained via plane images overlaid one by one. After multiple plane images are overlaid in the 3D space, due to a space discontinuity, a space domain convolution calculation may be performed to implement 3D data sample interpolation. In modern computer 3D construction field, the grid algorithm is widely used at present. A basic grid algorithm renders a 3D scene expressed by polygons to a 2D surface. A polygon is denoted by a set of triangles, and a triangle is denoted by three points in the 3D space. In a simplest implementation, a grid tool maps point data to a corresponding 2D coordinate point on an observer's display, and then fills the converted 2D triangles.

The above describes the generation of the 3D model. Those with ordinary skill in the art may generate the user body 3D model using other methods. The present disclosure does not restrict the method for generating the user body 3D model.

Through the above blocks 400 to 404, the smart TV box transmits the multiple 2D images used for generating the user body 3D to the server to generate the user body 3D model.

In some examples, after block 404, the method may further include blocks 406 to 408.

In block 406, the smart TV box receives the user body 3D model returned by the server, and displays the user body 3D to the user via the displaying device.

In some examples of the present disclosure, after displaying the user body 3D model via the displaying device, the smart TV box may further receive a sharing request of the user, transmits the sharing request to the server. The server shares the user body 3D model to a social network of the user according to the sharing request, e.g., sharing with a designated friend, to moments or blog, etc.

In block 408, the smart TV box transmits a saving request to the server, requesting the server to save the user body 3D model.

Through the above blocks 406 to 408, the smart TV box may display the user body 3D model generated by the server to the user. After the user confirms to the save the model, the smart TV box may transmit the saving request to the server to request the server to save the user body 3D model. Thus, when the user wants to try on a dress later, the server may directly retrieve the user body 3D model to generate the corresponding 3D composed image. The smart TV box does not need to prompt the user to provide the 2D images used for generating the user body 3D model.

In some examples, after the server generates the user body 3D model, the user may adjust the generated user body 3D model. At this time, before block 408, the method may further include the following.

In block 407, the smart TV box receives adjusting data input by the user, transmits the adjusting data to the server, wherein the server adjusts the user body 3D model according to the adjusting data.

For example, the user may input sizes of different body parts using the user input device as shown in FIG. 1, such that the server may adjust the user body 3D model.

Besides adjusting the sizes of various body parts, the user may also adjust hairstyle, skin color, etc.

After receiving the adjusting data, the server adjusts the user body 3D model generated in block 404 according to the received adjusting data, and transmits the adjusted user body 3D model to the smart TV box. Then the method proceeds to block 406 in which the smart TV box displays the adjusted user body 3D model to the user via the displaying device.

In block 410, the smart TV box transmits a composing request carrying a user identifier to the server.

In some examples of the present disclosure, after the user selects a dress he wants to try on, the user may clicks a try-on button displayed on the displaying device via the user input device as shown in FIG. 1, so as to emit the 3D composed image obtaining request to the smart TV box. In response to the 3D composed image obtaining request of the user, the smart TV box transmits the composing request carrying the user identifier of the user to the server. Thus, after receiving the composing request transmitted by the smart TV box, the server may inquire the database according to the user identifier. If the user body 3D model has been saved before, in this block, the server may directly retrieve the user body 3D model to generate the 3D composed image.

In this block, the server may generate the 3D composed image according to the user body 3D model and the 3D model of the dress according to a predefined algorithm.

In some examples of the present disclosure, the server saves the 3D model of the dress in advance. The model of the dress may be created using geometry modeling, physical modeling, or hybrid modeling manners, which is not restricted in the present disclosure. After the dress model is created, the server saves the 3D model of the dress in the database.

In block 412, the smart TV box receives the 3D composed image transmitted by the server, and displays the 3D composed image to the user via the displaying device.

Through displaying the 3D composed image to the user, the user is able to see the collocation effect of the selected dress, so as to accurately estimate whether the selected dress is suitable.

In some examples of the present disclosure, after block 412, the method may further include one or more of blocks 414 to 416.

In block 414, the smart TV box receives a transaction request of the user, transmits the transaction request to the server, wherein the server implements a transaction according to the transaction request.

In block 416, the smart TV box receives a sharing request of the user, transmits the sharing request to the server, wherein the server shares the 3D composed image generated in block 412 to a social network of the user.

For example, the 3D composed image may be shared with a designated friend, or may be shared to moments or blog, etc.

Figure 8:
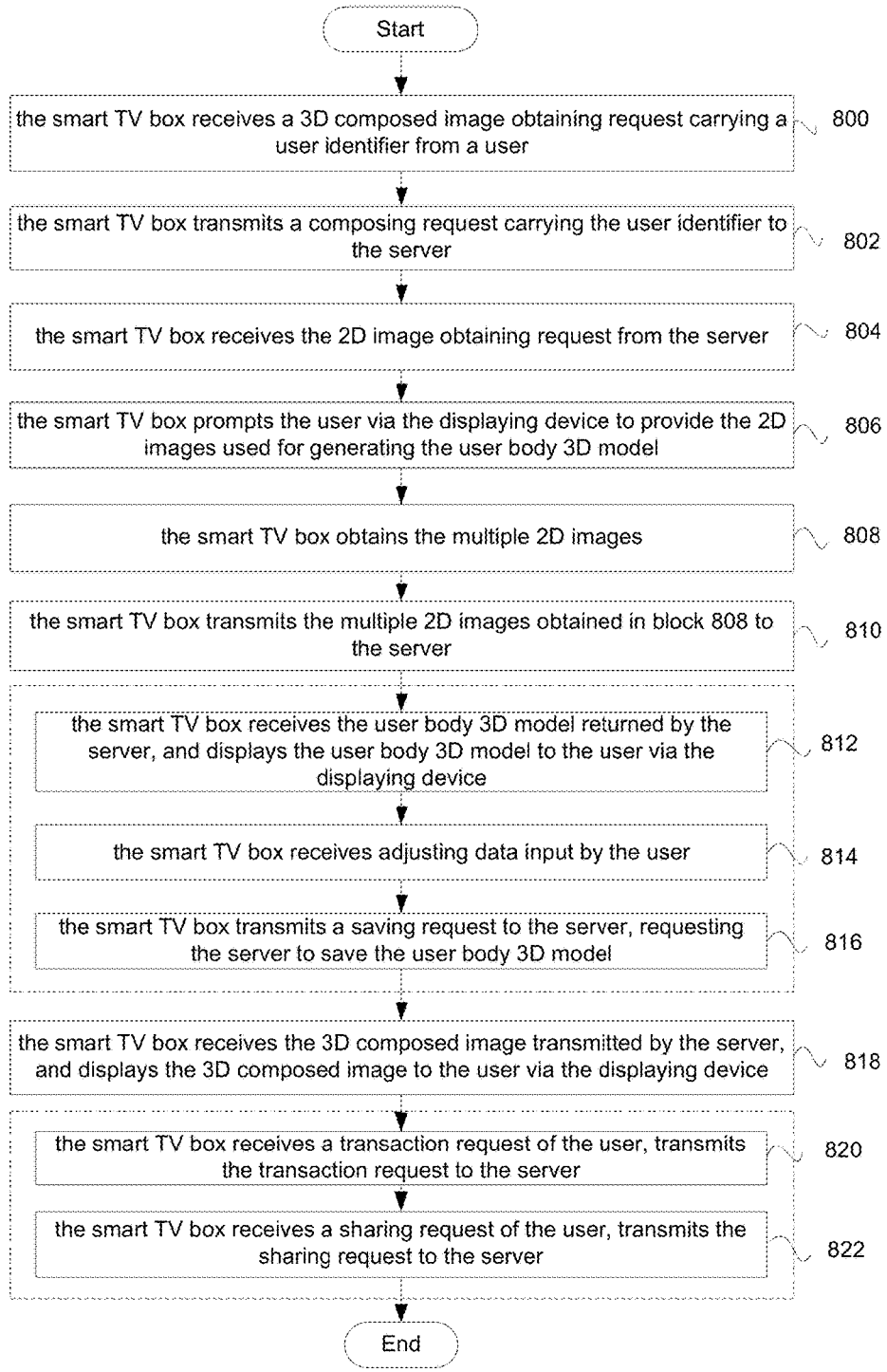
FIG. 8 is a flowchart illustrating another product image processing method according to some examples of the present disclosure.

FIG. 8 is a flowchart illustrating a product image processing method according to some examples of the present disclosure. In the example as shown in FIG. 8, clothing is still taken as an example. In this example, after the user selects a dress, the smart TV box prompts the user to provide the 2D images used for generating the user body 3D image. Then, the smart TV box transmits the multiple 2D images provided by the user to the server, so as to generate the 3D composed image reflecting the collocation effect of the combination of the user body and the dress according to the user body 3D model and the 3D model of the dress. As shown in FIG. 8, the method includes the following.

In block 800, the smart TV box receives a 3D composed image obtaining request carrying a user identifier from a user.

In some examples of the present disclosure, the smart TV box displays a page or a virtual TV channel on the displaying device to display the dress available for the user. The user may select a desired dress via the user input device shown in FIG. 1 and then clicks a "try-on" button, so as to emit the 3D composed image obtaining request to the smart TV box.

In block 802, the smart TV box transmits a composing request carrying the user identifier to the server, the server determines according to the user identifier whether it saves a corresponding user body 3D model; if not, the server transmits a 2D image obtaining request to the smart TV box, and executes block 804; otherwise, the server generates the 3D composed image according to the saved user body 3D model and transmits the generated 3D composed image to the smart TV box, and executes block 818.

In block 804, the smart TV box receives the 2D image obtaining request from the server.

In block 806, the smart TV box prompts the user via the displaying device to provide the 2D images used for generating the user body 3D model.

In block 808, the smart TV box obtains the multiple 2D images.

In block 810, the smart TV box transmits the multiple 2D images obtained in block 808 to the server, wherein the server generates the user body 3D model according to the multiple 2D images, and further generates the 3D composed image according to the user body 3D model and the 3D model of the dress selected by the user.

Blocks 806~810 are similar as blocks 400~404 and are not repeated herein.

Similar as the example shown in FIG. 4, after transmitting the multiple 2D images obtained in block 810 to the server, the method may further include the following blocks 812~816.

In block 812, the smart TV box receives the user body 3D model returned by the server, and displays the user body 3D model to the user via the displaying device.

In block 814, the smart TV box receives adjusting data input by the user, transmits the adjusting data to the server, wherein the server adjusts the user body 3D model according to the adjusting data.

In block 816, the smart TV box transmits a saving request to the server, requesting the server to save the user body 3D model.

In block 818, the smart TV box receives the 3D composed image transmitted by the server, and displays the 3D composed image to the user via the displaying device.

Through displaying the 3D composed image to the user, the user is able to see the collocation effect of the dress, so as to accurately estimate whether the dress are suitable.

Similar as the example shown in FIG. 4, in some examples of the present disclosure, after block 818, one or more of the following blocks may be included.

In block 820, the smart TV box receives a transaction request of the user, transmits the transaction request to the server, wherein the server implements a transaction according to the transaction request of the user.

In block 822, the smart TV box receives a sharing request of the user, transmits the sharing request to the server, wherein the server shares the 3D composed image to a social network of the user according to the sharing request.

The above examples describe the product image processing method provided by the present disclosure. Some examples of the present disclosure also provide a product image processing apparatus. Hereinafter, the product image processing apparatus provided by the examples of the present disclosure is described with reference to accompanying drawings.

Figure 9:
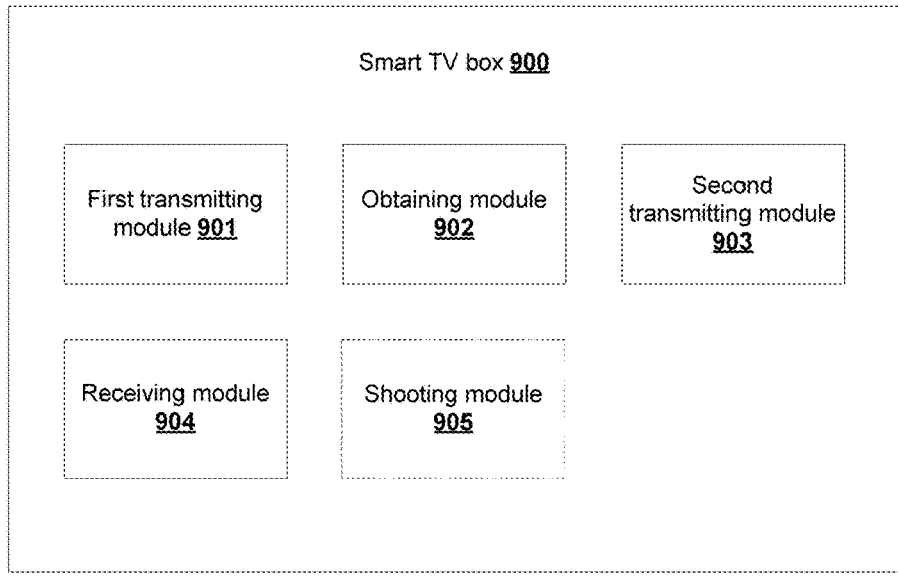
FIG. 9 is a schematic diagram illustrating a structure of the smart TV box according to some examples of the present disclosure.

FIG. 9 is a schematic diagram illustrating a structure of a product image processing apparatus according to some examples of the present disclosure. In the example as shown in FIG. 9, the apparatus is a smart TV box. As shown in FIG. 9, the smart TV box 900 includes: a first transmitting module 901, an obtaining module 902, a second transmitting module 903, and a receiving module 904; wherein the first transmitting module 901 is to prompt the user via a displaying device to provide multiple 2D images used for generating a user body 3D model;

the obtaining module 902 is to obtain the multiple 2D images;

the second transmitting module 903 is to transmit the multiple 2D images obtained by the obtaining module 902 to a server, wherein the server generates the user body 3D model according to the multiple 2D images and generates a 3D composed image according to a 3D model of a product selected by the user and the user body 3D model, the 3D composed image reflects a collocation effect of the user body and the product selected by the user;

the receiving module 904 is to receive the 3D composed image from the server; and the first transmitting module 901 is further to transmit the 3D composed image received by the receiving module 904 to the displaying device, wherein the displaying device displays the 3D composed image.

In some examples of the present disclosure, the second transmitting module 903 is further to, in response to a 3D composed image obtaining request, transmit a composing request carrying a user identifier to the server, wherein if the server determines according to the user identifier that it does not have the corresponding user body 3D model, the server transmits a 2D image obtaining request to the receiving module 904, requesting the smart TV box to provide the 2D images used for generating the user body 3D model; after the server generating the user body 3D model, the server saves the user body 3D model; otherwise, the server generates the 3D composed image according to the 3D model of the product selected by the user and the user body 3D model;

the receiving module 904 is further to receive the 2D image obtaining request; and the first transmitting module 901 is further to, after the receiving module 904 receives the 2D image obtaining request, prompt the user to provide the multiple the 2D images used for generating the user body 3D model via the displaying device.

In some examples of the present disclosure, the smart TV box 900 may further include:

a shooting module 905, to shoot for the user using one or more cameras, and transmit the images obtained via shooting to the obtaining module 902; and the obtaining module 902 is further to receive the images transmitted by the shooting module 905, and determine the images as the 2D images used for generating the user body 3D model.

In some examples of the present disclosure, the obtaining module 902 may also read the 2D images from another device, and determine the 2D images read from the device as the 2D images used for generating the user body 3D model.

In some examples of the present disclosure, the receiving module 904 is further to, after the second transmitting module 903 transmits the multiple 2D images obtained by the obtaining module 902 to the server, receive the user body 3D model returned by the server; and the first transmitting module 901 is further to, transmit the user body 3D model received by the receiving module 904 to the displaying device, wherein the displaying device displays the user body 3D model to the user.

In some examples of the present disclosure, the receiving module 904 is further to receive adjusting data input by the user; and the second transmitting module 903 is further to transmit the adjusting data received by the receiving module 904 to the server, wherein the server adjusts the user body 3D model according to the adjusting data.

The above modules 901~905 may be instruction modules stored in a computer-readable storage medium. The instruction modules may include instructions executable by a processor. When the processor executes the instructions of modules 901~905, various functions of the modules 901~905 may be implemented. For example, the above modules 901~905 may be instruction modules in the product image processing application 209 in the memory 220 in FIG. 2. At this time, the modules 901~905 may be the first transmitting module 901, the obtaining module 902, the second transmitting module 903, the receiving module 904 and the shooting module 905 as shown in FIG. 2.

Figure 10:
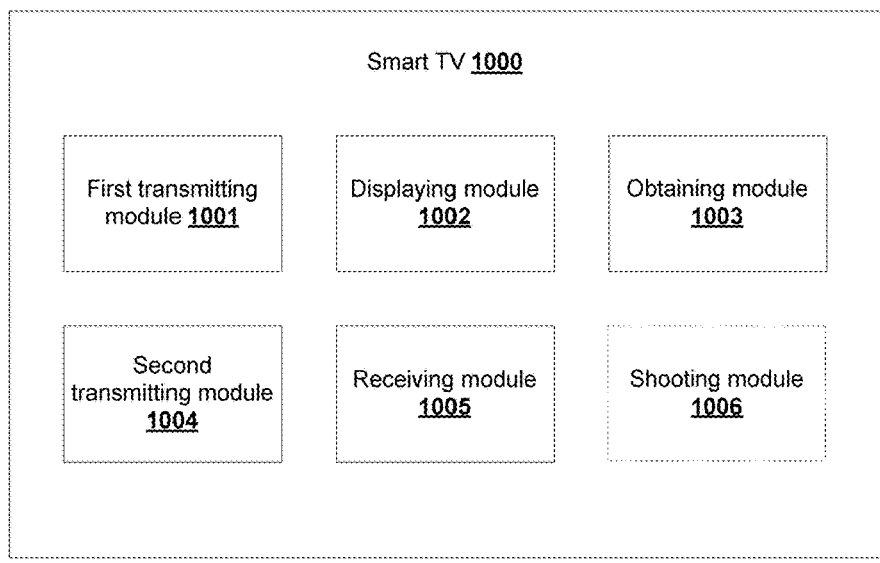
FIG. 10 is a schematic diagram illustrating another structure of the smart TV box according to some examples of the present disclosure.

FIG. 10 is a schematic diagram illustrating another product image processing apparatus according to some examples of the present disclosure. In the example as shown in FIG. 10, the apparatus is a smart TV. As shown in FIG. 10, the smart TV 1000 includes:

a first transmitting module 1001, a displaying module 1002, an obtaining module 1003, a second transmitting module 1004, and a receiving module 1005; wherein the first transmitting module 1001 is to prompt the user via the displaying module 1002 to provide multiple 2D images used for generating a user body 3D model;

the obtaining module 1003 is to obtain the multiple 2D images;

the second transmitting module 1004 is to transmit the multiple 2D images obtained by the obtaining module 1003 to a server, wherein the server generates the user body 3D model according to the multiple 2D images and generates a 3D composed image according to the user body 3D model and a 3D model of a product selected by the user, the 3D composed image reflects a collocation effect of the user body and the product selected by the user; and the receiving module 1005 is further to receive the 3D composed image from the server; and the first transmitting module 1001 is further to transmit the 3D composed image received by the receiving module 1005 to the displaying module 1002, wherein the displaying module 1002 displays the 3D composed image to the user.

In some examples of the present disclosure, the second transmitting module 1004 is further to, in response to a 3D composed image obtaining request, transmits a composing request carrying a user identifier to the server, wherein if the server determines according to the user identifier that it does not have the corresponding user body 3D model, the server transmits a 2D image obtaining request to the receiving module 1005, requesting for the multiple 2D images used for generating the user body 3D model; after generating the user body 3D model, the server saves the generated user body 3D model; otherwise, the server generates the 3D composed image according to the 3D model of the product selected by the user and the user body 3D model;

the receiving module 1005 is further to receive the 2D image obtaining request; and the first transmitting module 1001 is further to, after the receiving module 1005 receives the 2D image obtaining request, prompt the user via the displaying module 1002 to provide the multiple 2D images used for generating the user body 3D model.

In some examples of the present disclosure, the smart TV 1000 may further include:

a shooting module 1006, to shoot for the user using one or more cameras, and transmit the images obtained via shooting to the obtaining module 1003; and the obtaining module 1003 is further to receive the images transmitted by the shooting module, and determine the images as the 2D images used for generating the user body 3D model.

In some examples of the present disclosure, the obtaining module 1003 may also read 2D images from another device, and determine the read 2D images as the 2D images used for generating the user body 3D model.

In some examples of the present disclosure, the receiving module 1005 is further to, after the second transmitting module 1004 transmits the multiple 2D images obtained by the obtaining module 1003 to the server, the user body 3D model returned by the server;

the first transmitting module 1001 is further to, transmit the user body 3D model received by the receiving module 1005 to the displaying module 1002, so as to display the user body 3D model to the user via the displaying module 1002.

In some examples of the present disclosure, the receiving module 1005 is further to receive adjusting data input by the user; and the second transmitting module 1004 is further to transmit the adjusting data received by the receiving module 1005 to the server, wherein the server adjusts the user body 3D model according to the adjusting data.

Figure 11:
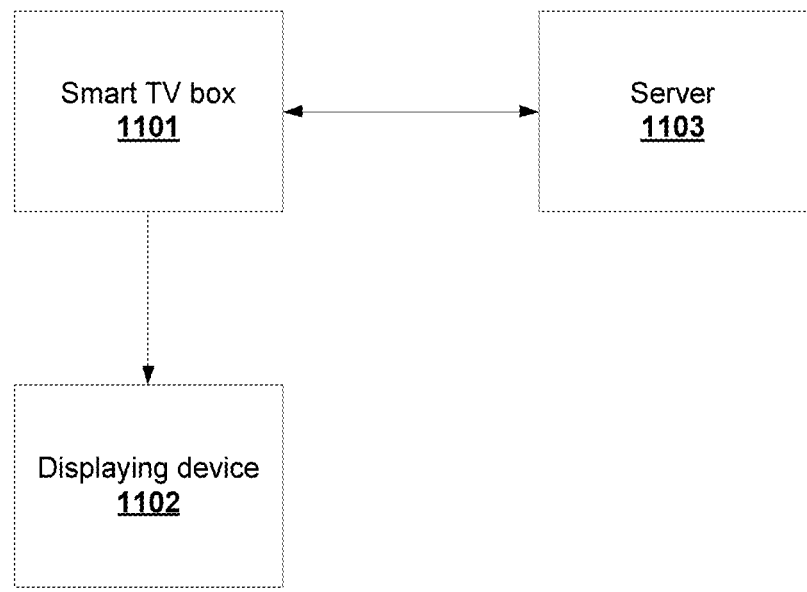
FIG. 11 is a schematic diagram illustrating a structure of a product image processing system according to some examples of the present disclosure.

FIG. 11 is a schematic diagram illustrating a structure of a product image processing system according to some examples of the present disclosure. As shown in FIG. 11, the system 1100 includes: a smart TV box 1101, a displaying device 1102 and a server 1103; wherein the smart TV box 1101 is to, prompt the user to provide multiple 2D images used for generating a user body 3D model, obtain the multiple 2D images, transmit the 2D images to the server, receive a 3D composed image from the server, and transmit the 3D composed image to the displaying device;

the server 1103 is to, generate the user body 3D model according to the multiple 2D images received from the smart TV box 1101, and generate the 3D composed image according to a 3D model of a product selected by the user and the user body 3D model, wherein the 3D composed image reflects a collocation effect of the user body and the product selected by the user, and transmit the 3D composed image to the smart TV box 1101; and the displaying device 1102 is to receive the 3D composed image from the smart TV box 1101 and display the 3D composed image.

Figure 12:
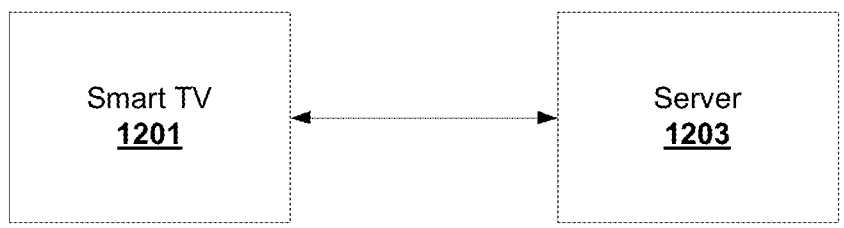
FIG. 12 is a schematic diagram illustrating another structure of a product image processing system according to some examples of the present disclosure.

FIG. 12 is a schematic diagram illustrating another structure of a product image processing system according to some examples of the present disclosure. As shown in FIG. 12, the system 1200 includes: a smart TV 1201 and a server 1202; wherein the smart TV 1201 is to, prompt the user to provide multiple 2D images used for generating a user body 3D model, obtain the multiple 2D images, transmit the obtained multiple 2D images to the server, receive a 3D composed image from the server, display the 3D composed image;

the server 1202 is to, generate the user body 3D model according to the multiple 2D images received from the smart TV 1201, and generate the 3D composed image according to a 3D model of a product selected by the user and the user body 3D model, wherein the 3D composed image reflects a collocation effect of the user body and the product selected by the user, and transmit the 3D composed image to the smart TV 1201.

The terminal and systems provided by the above examples have the same concept with the above method examples. Detailed implementation may be seen in the method examples and are not repeated herein.

In the product image processing method, apparatus and system provided by the examples of the present disclosure, multiple 2D images of the user may be obtained via the smart TV box. The server may generate a user body 3D model according to the multiple 2D images and may generate a 3D composed image according to the user body 3D model and a 3D model of the product selected by the user. The 3D composed image is able to reflect a collocation effect of a combination of the user body and the product selected by the user. The smart TV box displays the 3D composed image to the user via the displaying device. The solution provided by the examples of the present disclosure improves the functions of the smart TV box. Thus, the user is able to accurately estimate whether the selected product is suitable according to the 3D composed image, so as to determine whether to buy the product.

In addition, the functional modules in various examples of the present disclosure may be integrated in one processing unit, or may be independent modules. Two or more modules may also be integrated in one module. The integrated modules may be implemented via hardware, or in form of software units. The above functional modules may be configured in one terminal or a network node, or may be distributed in multiple terminals or network nodes.

In addition, each example in the present disclosure may be implemented by a data processing application executed by a data processing device such as a computer. Certainly, the data processing application is part of the present disclosure.

In addition, the data processing application is generally stored in a storage medium and is executed through reading from the storage medium or copying the application to a storage device (such hardware disk and/or memory) of the data processing device. Therefore, such storage medium is also within the protection scope of the present disclosure. The storage medium may be in various forms, e.g. paper storage medium (such as tape), disk storage medium (e.g. floppy disk, hard disk, flash, etc.), optical storage medium (e.g. CD-ROM, etc.), magneto-optical storage medium (e.g. MO, etc.).

The present disclosure also provides a storage medium, which stores a data processing application for implementing any one of the above examples provided by the present disclosure.

Those with ordinary skill in the art would know that all or some of the blocks of the foregoing examples may be implemented by hardware, or may be implemented via programs executed by relevant hardware. The program may be stored in a computer readable storage medium. The storage medium may be a read only memory, disk or optical disk, etc.

What has been described and illustrated herein is an example of the disclosure along with some of its variations. The terms, descriptions and figures used herein are set forth by way of illustration. Many variations are possible within the spirit and scope of the disclosure, which is intended to be defined by the following claims and their equivalents.

The invention claimed is:

1. A product image processing method, the method comprising:
    receiving, by a smart TV box, a 3-dimensional (3D) composed image obtaining request;
    in response to the 3D composed image obtaining request, transmitting by the smart TV box a composing request carrying a user identifier to a server;
    if the server determines according to the user identifier that there is no corresponding user body 3D model in the server, the server returns a 2-dimensional (2D) image obtaining request to the smart TV box, requesting a plurality of 2D images used for generating a user body 3D model;
    when receiving the 2D image obtaining request from the server, prompting a user, by the smart TV box via a displaying device, to provide the plurality of images used for generating the user body model;
    receiving by the smart TV box the plurality of 2D images;
    transmitting by the smart TV box the obtained plurality of 2D images to the server, wherein the server generates the user body 3D model according to the plurality of 2D images, and generates a 3D composed image according to a 3D model of a product selected by the user and the user body 3D model, the 3D composed image reflects a collocation effect of a user body and the product selected by the user;
    receiving by the smart TV box the 3D composed image from the server, and displaying the 3D composed image via the displaying device; and
    if the server determines according to the user identifier that there is the user body 3D model in the server, the server executes the process of generating the 3D composed image according to the user body 3D model and the 3D model of the product selected by the user.

2. The method of claim 1, wherein the plurality of 2D images is 2D images from different angles of the user;

the prompting the user by smart TV box to provide the plurality of 2D images used for generating the user body 3D model comprises:
displaying by the smart TV box via the displaying device a page or a virtual TV channel to the user to prompt the user to provide the 2D images from different angles.

3. The method of claim 1, wherein the smart TV box obtaining the plurality of 2D images comprises at least one of:
the smart TV box shooting for the user via one or more cameras, and determining shot images as the 2D images used for generating the user body 3D model; and
the smart TV box reading 2D images from another device, and determining the read 2D images as the 2D images used for generating the user body 3D model.

4. The method of claim 1, further comprising:
after the smart TV box transmits the obtained plurality of 2D images to the server, receiving by the smart TV box the user body 3D model returned by the server, and displaying the user body 3D model to the user via the displaying device.

5. The method of claim 4, further comprising:
receiving by the smart TV box adjusting data input by the user, transmitting the adjusting data to the server, wherein the server adjusts the user body 3D model according to the adjusting data.

6. The method of claim 1, further comprising:
receiving by the smart TV box a transaction request of the user, transmitting the transaction request to the server, wherein the server implements a transaction of the product selected by the user according to the transaction request.

7. The method of claim 1, further comprising:
receiving by the smart TV box a sharing request of the user, transmitting the sharing request to the server, wherein the server shares at least one of the user body 3D model and the 3D composed image to a social network of the user according to the sharing request.

8. A smart TV box comprising: a processor and a non-transitory computer readable memory; wherein the non-transitory computer-readable memory stores instructions, that when executed by the processor, cause the processor to:
receive a 3-dimensional (3D) composed image obtaining request;
in response to the 3D composed image obtaining request, transmit a composing request carrying a user identifier to a server;
wherein if the server determines according to the user identifier that there is no corresponding user body 3D model in the server, the server returns a 2-dimensional (2D) image obtaining request to the smart TV box, requesting a plurality of 2D images used for generating a user body 3D model;
when receiving the 2D image obtaining request from the server, prompt a user via a displaying device to provide the plurality of 2D images used for generating the user body 3D model;
obtain the plurality of 2D images;
transmit the plurality of 2D images to the server, wherein the server generates the user body 3D model according to the plurality of 2D images and generates a 3D composed image according to the user body 3D model and a 3D model of a product selected by the user, the 3D composed image reflects a collocation effect of a user body and the product selected by the user;
receive the 3D composed image from the server; and
transmit the 3D composed image to the displaying device, wherein the displaying device displays the 3D composed image.

9. The smart TV box of claim 8, wherein the instructions, when executed by the processor, further cause the processor to:
transmitting the plurality of 2D images to the server, receive the user body 3D model returned by the server; and
transmit the user body 3D model to the displaying device, wherein the displaying device displays the user body 3D model to the user.

10. The smart TV box of claim 9, wherein the instructions, when executed by the processor, further cause the processor to: receive adjusting data input by the user; and
transmit the adjusting data the server, wherein the server adjusts the user body 3D model according to the adjusting data.

11. The smart TV box of claim 8, wherein the instructions, when executed by the processor, further cause the processor to: receive a transaction request of the user; and
transmit the transaction request to the server, wherein the server implements a transaction of the product selected by the user according to the transaction request.

12. The smart TV box of claim 8, wherein the instructions, when executed by the processor, further cause the processor to: receive a sharing request of the user; and
transmit the sharing request to the server, wherein the server shares at least one of the user body 3D model and the 3D composed image to a social network of the user according to the sharing request.

13. A smart TV comprising: a processor and a non-transitory computer-readable memory, the non-transitory computer-readable memory stores instructions, that when executed by the processor, cause the processor to:
receive a 3-dimensional (3D) composed image obtaining request;
in response to the 3D composed image obtaining request, transmit a composing request carrying a user identifier to a server;
wherein if the server determines according to the user identifier that there is no corresponding user body 3D model in the server, the server returns a 2-dimensional (2D) image obtaining request to the smart TV box, requesting a plurality of 2D images used for generating a user body 3D model;
when receiving the 2D image obtaining request from the server, prompt a user to provide the plurality of 2D images used for generating the user body 3D model;
obtain the plurality of 2D images;
transmit the plurality of 2D images to the server, wherein the server generates the user body 3D model according to the plurality of 2D images and generates a 3D composed image according to a 3D model of a product selected by the user and the user body 3D model, the 3D composed image reflects a collocation effect of a user body and the product selected by the user;
receive the 3D composed image from the server; and
display the 3D composed image.

14. The smart TV of claim 13, wherein the instructions, when executed by the processor, further cause the processor to:
transmitting the plurality of 2D images to the server, receive the user body 3D model returned by the server; and
display the user body 3D model.

15. The smart TV of claim 14, wherein the instructions, when executed by the processor, further cause the processor to: receive adjusting data input by the user; and
- transmit the adjusting data to the server, wherein the server adjusts the user body 3D model according to the adjusting data.

16. The smart TV of claim 13, wherein the instructions, when executed by the processor, further cause the processor to: receive a transaction request of the user; and
- transmit the transaction request to the server, wherein the server implements a transaction of the product selected by the user according to the transaction request.

17. The smart TV of claim 13, wherein the instructions, when executed by the processor, further cause the processor to receive a sharing request of the user; and
- transmit the sharing request to the server, wherein the server shares at least one of the user body 3D model and the 3D composed image to a social network of the user according to the sharing request.

\* \* \* \* \*